United States Patent [19]

Willard

[11] 3,997,684
[45] Dec. 14, 1976

[54] METHOD FOR MAKING EXPANDED POTATO BASED SNACK PRODUCTS

[76] Inventor: Miles J. Willard, P.O. Box 2774, Idaho Falls, Idaho 83401

[22] Filed: Nov. 27, 1974

[21] Appl. No.: 527,604

Related U.S. Application Data

[60] Division of Ser. No. 309,509, Nov. 24, 1972, Pat. No. 3,886,291, which is a continuation-in-part of Ser. No. 174,232, Aug. 23, 1971, abandoned, which is a continuation of Ser. No. 789,922, Jan. 8, 1969, abandoned.

[52] U.S. Cl. .............................. 426/550; 426/559; 426/578; 426/625; 426/637; 426/441; 426/446
[51] Int. Cl.² ............................................ A23L 1/10
[58] Field of Search .......... 426/346, 347, 372, 438, 426/440, 441, 445, 446, 496, 141, 549, 559, 560, 578, 622, 625, 637

[56] References Cited

UNITED STATES PATENTS

| | | | |
|---|---|---|---|
| 3,020,162 | 2/1962 | Cunningham | 426/439 |
| 3,131,063 | 4/1964 | Gerkens | 426/441 |
| 3,190,755 | 6/1965 | Peden | 426/440 |
| 3,220,852 | 11/1965 | Gerkens | 426/440 |
| 3,230,094 | 1/1966 | Hilton | 426/637 |
| 3,259,503 | 7/1966 | Tan | 426/439 |
| 3,282,704 | 11/1966 | Fritzberg | 426/441 |
| 3,297,450 | 1/1967 | Loska | 426/441 |
| 3,451,822 | 6/1969 | Fast | 426/550 |
| 3,580,728 | 5/1971 | Gulstad | 426/440 |
| 3,594,187 | 7/1971 | Liepa | 426/637 |
| 3,703,379 | 11/1972 | Cummisford | 426/559 |

FOREIGN PATENTS OR APPLICATIONS

| | | | |
|---|---|---|---|
| 871,648 | 5/1971 | Canada | 426/637 |
| 777,753 | 2/1968 | Canada | 426/637 |
| 1,189,367 | 7/1961 | Germany | 426/441 |
| 687,015 | 2/1953 | United Kingdom | 426/441 |
| 750,217 | 6/1956 | United Kingdom | 426/441 |
| 985,808 | 3/1965 | United Kingdom | 426/441 |
| 1,053,879 | 1/1967 | United Kingdom | 426/441 |
| 985,809 | 3/1965 | United Kingdom | 426/637 |
| 1,109,930 | 4/1968 | United Kingdom | 426/441 |

Primary Examiner—Norman Yudkoff
Assistant Examiner—Martin G. Mullen
Attorney, Agent, or Firm—Christie, Parker & Hale

[57] ABSTRACT

A potato based food snack is prepared by mixing cooked potato solids with water and ungelatinized starch to form a dough having between about 40 percent and about 50 percent solids by weight, forming the dough into pieces, and frying the pieces in hot cooking oil. The dough contains a sufficient amount of free available gelatinized starch to cause the pieces to expand at least about 1.6 times their original dimension upon frying such that they produce a potato snack product having a porous internal structure encased in a dense exterior layer of substantially reduced porosity.

20 Claims, 19 Drawing Figures

METHOD FOR MAKING EXPANDED POTATO BASED SNACK PRODUCTS

This is a division of my pending application Ser. No. 309,509, filed Nov. 24, 1972, now U.S. Pat. 3886291 which, in turn, is a continuation-in-part of my pending application Ser. No. 174,232, filed Aug. 23, 1971, now abandoned which, in turn, is a continuation of application Ser. No. 789,922, filed Jan. 8, 1969, now abandoned.

BACKGROUND OF THE INVENTION

This invention relates to food snack products, and more particularly to a novel expanded potato snack having a texture and flavor closely resembling that of fresh potato chips.

Potato chips are well known snack products prepared by frying thin slices of raw, fresh potatoes. Several reasons for the commercial success of potato chips are their crisp texture and fresh potato flavor, and their suitability for mass production techniques.

Since the time potato chips first became a commercial success, food processors in this country and abroad have attempted to produce a prefabricated potato-based snack product which captures the flavor and texture of fresh potato chips, and which also has an appearance or structure similar to potato chips, and which can be manufactured in high volume at a relative low cost. Generally speaking, most prior art "expanded" potato snacks (i.e., snacks produced from a potato-based dough which is expanded to a porous condition by immersion in hot cooking oil) have not been successful commercially because they do not have the combined flavor and crisp texture resembling that of potato chips, together with the capability of being mass produced at a relatively low cost.

The prior art prefabricated potato snacks generally can be grouped in four categories which include (1) the dry collet process, (2) extrusion of dry potatoes, (3) forming a high solids content dough into a thin sheet, cutting, and frying, and (4) forming and frying potato snacks directly from a relatively moist dough. 1. In the dry collet process, a dry, thin portion of a starch-based gel, commonly termed a "collet," is expanded by a short immersion in hot fat. Typically, mixtures of potato solids and various starches are cooked to completely gelatinize all the starch molecules. The starch gels typically have a relatively high solids content, i.e., usually over 60 percent by weight. The products are held or cooled to reduce the stickiness of the gel, and are later sliced or cut into desired shapes and dried to form a hard pellet. The products are expanded to about three to six times their original thickness when immersed in hot fat. The entrapment of steam bubbles in the heated starch gel creates a uniformly porous structure when the snack is viewed in cross-section.

The processes disclosed in U.S. Pat. No. 2,863,720 to Speiser and U.S. Pat. No. 3,131,063 to Gerkens are typical dry collet processes in which dehydrated potatoes and starch at about 65% solids are gelatinized at high temperatures and pressures during extrusion, and then cut and dried to form dry stable collets.

Control of the dried collet processes, such as that of Speiser, is difficult and expensive in continuous operation primarily because of the interruptions required to allow the gels to become firm and less sticky so they can be cut or sliced and dried. The final puffed product is extremely soft in texture, there is little initial bite, and it tends to lack the flavor of fresh fried potato chips.

Figure 1A:
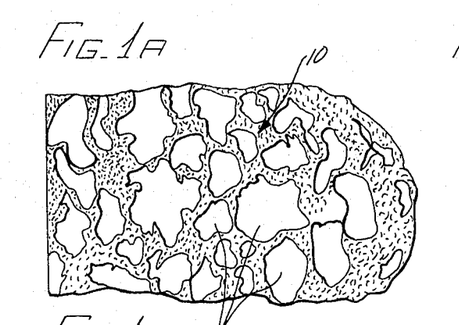
FIGS. 1A through 1I are cross-sectional elevation views showing the internal structure of typical prior art potato snack products.

The potato snack product of this invention has novel structural aspects which will be described in detail below. The structure of the present snack product will be understood best by comparing it with the structure of the prior art snacks by referring to the accompanying drawings which are described in detail below. FIG. 1A is a cross-sectional elevation view showing the internal structure typical of the snacks described here in category (1).

2. In the dry extrusion process, dry starch-containing granular materials such as potato solids and corn meal are used. The moisture content of the normally between 12 percent to 14 percent by weight. The granular solids are fed into a single screw extruder operated at high speed and close tolerance to increase the temperature and work the granular material, thereby gelatinizing the starch in it. The material is finally forced at very high pressure through a series of die openings at the end of the screw. At this point the material expands greatly into a fluffy structured snack product due to the rapid expansion of the entrapped steam. The product is then dried to remove residual moisture and is often coated with fat. These snacks have a rather uniform porous structure with large inner voids, and a flavor quite untypical of potato chips.

Figure 1B:
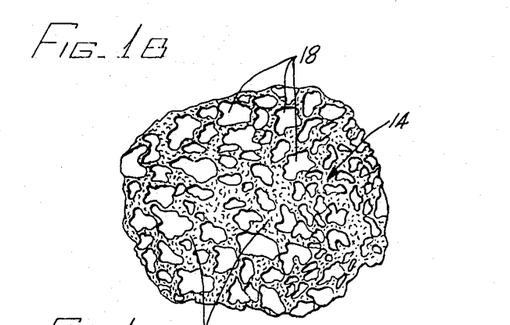

FIG. 1B is a cross-sectional elevation view showing the internal structure typical of this group of potato snack products.

3. Several processes which have duplicated the appearance of fresh potato chips generally form a thin sheet of dough comprised chiefly of dehydrated potato solids and water. The dough is cut or rolled into desired shapes, normally at least partially dried, and then fried in a continuous operation to produce an expanded snack product. The dough generally has a solids range of about 60 to 70 percent by weight, and all the starch in the dough is completely gelatinized before it is fried. The pieces of partially dried dough material are generally more than 85% solids at the time they enter the frying medium.

Some of the products made by processes in this category are described in U.S. Pat. No. 3,539,356 to Benson, U.S. Pat. No. 3,297,450 to Loska, U.S. Pat. No. 3,451,822 to Fast el al, and U.S. Pat. No. 3,594,187 and Canadian Pat. No. 871,648 to Liepa. Generally speaking, control of the processes in this category in continuous operation is difficult and expensive, because of the requirement for complex extrusion, die cutting, and dehydration. The finished product is usually puffed to about four times it original thickness upon frying, and is characterized by uniform structure throughout the product when the product is viewed in cross-section. The texture and flavor of the fried product are generally not typical of freshly fried potato chips, and the products are difficult to store without breakage.

FIGS. 1F through 1I show cross-sectional elevation views of the internal structure typical of this group of potato snack products. 4. In contrast to the large number of prior art snacks produced by the methods in the preceding categories, attempts to make a natural tasting potato snack by forming and directly frying a relatively moist potato-based dough generally have been unsuccessful. One product formerly sold in the Western United States under the trademark Viko Chips was made by combining dehydrated potatoes and wheat flour with minor amounts of rice flour and corn flour to form a dough having a solids content of about 52 to 55 percent. The dough was extruded under high pressure through a piston extruder and fried. The texture of the fried product is relatively hard. There are no internal voids, as there is relatively little expansion during frying. (FIG. 1D is a cross-sectional elevation view showing the internal structure typical of this product.) Moreover, the flavor of the product did not resemble potato chips due to the overpowering flavor of the wheat flour.

In a similar process disclosed in British Pat. No. 1,109,930 owned by J. Bibby and Sons, Ltd., potato solids are mixed with potato starch to form a dough containing 30 to 40 percent solids. The dough is extruded through a round opening and fried. When viewed in cross-section, as shown in FIG. 1E, the fried product is seen to contain small voids filled with fat surrounded by a very thin surface skin. Essentially no expansion occurs when the product is fried. Moreover, considerable care must be exercised in frying the product because the pieces tend to stick together in the fryer.

SUMMARY OF THE INVENTION

This invention provides an expanded potato snack having a novel appearance or structure distinct from that of potato chips, and which has a crisp texture and a potato flavor resembling that of potato chips. An important advantage of the potato snack is its capability of being manufactured in conventional equipment in a continuous mass production process at a relatively low cost.

Briefly, the potato snack is prepared by mixing cooked potato solids with water and ungelatinized starch to form a dough having between about 40 and about 50 percent solids by weight. The dough is formed into pieces which are then fried immediately in cooking oil to produce an expanded potato product. The potato dough at the time of frying contains a combination of ungelatinized starch, preferably raw potato starch, potato solids, including a quantity of intact potato cells, and a quantity of free available gelatinized starch solids. Best results are obtained when the ungelatinized starch is present in the range between about 30 to about 70 percent by weight of the total solids present in the dough. The amount of free available gelatinized starch in the dough is controlled so that the dough pieces expand at least about 1.6 times their original dimension upon frying to form a snack product having a cellular internal structure encased in a dense exterior layer of substantially reduced porosity.

Products such as those manufactured by the processes grouped as categories (1), (2), and (3) above expand more than about three times their original thickness. They generally have a lighter bulk density than the products of this invention, and are generally characterized by a softer, less crunchy texture.

This invention is grouped with the processes of category (4) above. The dough prepared in accordance with this invention has a potato solids content which is generally lower than the dough mixtures characteristic of the prior art in this and the other categories, yet it is capable of producing a snack product having a typical potato chip flavor, without excessive coloration or fat absorption, by directly frying the subdivided pieces of dough. By operating in the range of 40 to 50 percent solids, the dough can be handled in many types of standard snack forming equipment readily available and well known in the industry. This simplifies the production so that the product can be mass produced at a relatively low cost.

In addition to the above advantages, the process of this invention produces a fried product having a novel structure and texture. The finished product has a relatively porous internal structure encased in a continuous relatively dense exterior surface layer of fried potato solids. The structure of the outer surface layer of the finished product is very similar to the structure of a fresh potato chip. Thus, the novel product closely resmbles two overlying thin potato chips joined by a porous internal structure of expanded potato solids. The exterior layer of the product shatters when chewed to provide a crunchy sensation which is unlike any expanded potato product produced by the prior art. The release of potato flavor from the snack when chewed is similar to that of fresh potato chips because of the similarity between potato chips and the outer layer of the present snack. The inner porous structure can be controlled to modify the texture of the product. For example, a completely dense product (produced by a solids content outside the 40 to 50 percent range) is hard and horny, and its interior is characterized by overbrowning. Conversely, the dense outer layer of the present snack product separates slightly when fried, and entraps water vapor which produces the porous inner structure which does not become overcooked by the hot cooking oil. Thus, overbrowning does not occur, and the snack maintains the desired fresh potato chip flavor.

DETAILED DESCRIPTION OF THE PREFERRED EMBODIMENTS

This invention provides a snack product prepared by mixing cooked potato solids with raw ungelatinized potato starch, adding water to form a dough, extruding pieces from the dough, and frying the pieces to form an expanded fried potato snack. The composition of the potato-based dough at the time of extrusion into the fryer is adjusted to control the expansion of the dough during frying. In this manner, an expanded potato snack having a novel structure can be formed, while concurrently insuring that the finished product has a flavor and crisp texture resembling that of freshly fried potato chips.

The degree of expansion of the potato-based dough of this invention is controlled so that when the dough is fried, it has an expansion ratio generally in the range of 1.6-to-1 to 3.0-to-1, i.e., it expands between 1.6 to 3.0 times its original thickness. The expansion ratio is calculated as the thickness of the fried product divided by the original die width. A fried product having an expansion ratio lower than the minimum desired expansion ratio, i.e., 1.6-to-1, generally is unacceptable because of its hard, horny condition. In some instances a product having an expansion ratio greater than 3.0 is acceptable, as will be discussed in detail below. In all cases the finished product has a novel structure characterized generally by a porous interior structure encased in a continuous dense exterior layer of substantially reduced porosity. The detailed structural and textural characteristics of the product will be described in detail below.

The expansion of an extrusion of potato-based dough is controlled in accordance with this invention by maintaining the solids content of the dough, prior to extrusion, between about 40 and about 50 percent by weight, preferably between 42 and 48 percent, and within this level adjusting the quantity of available free gelatinized starch in the mixture.

For example, when extruding a dough composed of 750 grams of fresh, mashed potatoes and 355 grams of potato starch (41.6 percent solids) through a slot 36 mils (0.036 in.) high and one inch wide, the dough does not have sufficient cohesion to be extruded into a coherent strip. With the addition of 5 grams of pregelatinized potato starch, the dough adheres, but is fairly crumbly during extrusion and after frying, and the insufficient expansion of the dough during frying results in an undesirably hard, horny product. Increasing the quantity of pregelatinized starch to 40 grams results in excessive puffing and expansion of the product due to the entrapment of steam within the sealed surfaces of the snack piece during frying. By adjusting the amount of pregelatinized starch between 5 and 10 grams, optimum appearance and texture result.

The same results can be demonstrated without adding previously gelatinized starch products. A normal fresh, mashed potato such as described in the previous example contains approximately 4 percent ruptured cells. Even with all of the starch from these cells being mixed uniformly through the dough, the quantity of starch was insufficient to contain the proper amount of steam bubbles. However, if the mixture of mashed potatoes and potato starch is subjected to vigorous agitation, the starch released from additionally ruptured potato cells provides the binding power to form the necessary controlled expansion of the dough strip during frying. If the agitation is continued, excessive gelatinized starch is released through the rupturing of additional potato cells, and the same undesirable puffing condition described above results.

When using dehydrated potatoes in this process, the quantity of gelatinized free starch in the dough can be adjusted by addition of previously gelatinized and dried potato starch or other starches, or through the choice of dehydrated potato ingredients having known quantities of free gelatinized starch. By free gelatinized starch is meant starch available as a binding agent and not contained in an intact potato cell, whether originally present in one of the potato ingredients used in this process or not.

The potato-based dough described in this invention contains a quantity of raw ungelatinized starch. (By "raw ungelatinized starch" is meant the substantially pure granular carbohydrate separated from the product with which it occurs in nature. This is to be distinguished from flour, which contains certain significant amounts of solids other than starch.) The critical amount of ungelatinized starch present in the dough is in the range of about 30 to about 70 percent by weight based on the total dry solids present. As shown in the examples below, the content of ungelatinized starch in the dough, based on the total dry solids present, varies from about 30 to about 50 percent when the dough is made from dehydrated cooked potatoes, such as potato flakes, potato granules, and mixtures thereof. The examples show that this percentage is above about 50 percent but below about 70 percent when the dough is made from cooked mashed potatoes. An ungelatinized starch content below about 30 percent produces undesirable scorching of the finished product. An ungelatinized starch content above about 70 percent produces a significant reduction in the potato flavor and expansion of the product and also increases fat absorption beyond the point where a commercially acceptable product is produced. Microscopic examination of the fried products indicates that substantially all of the ungelatinized starch is gelatinized during frying. It appears that the available gelatinized starch in the dough prior to frying controls the initial expansion as bubbles of steam are formed immediately after the dough is immersed in the hot frying medium. The gelatinization and eventual dehydration of the raw starch provides additional binding material which limits expansion by forming a continuous dense outer surface layer that entraps the inner bubbles, creating a porous internal structure and the desired crisp texture of the fried product.

Four general forms of dehydrated potatoes which can be considered for this process are (1) potato granules, (2) normal potato flakes, (3) potato flour, and (4) diced dehydrated potatoes.

1. Potato granules are unicellular dehydrated mashed potatoes in powdered or granule form. This product contains a relatively small quantity of free gelatinized starch on a weight basis due to the method of manufacture (see Potato Processing, edited by Talbot & Smith, 2d Ed., publ. by Avi). When deep fried potato snacks prepared by the method of this invention are made from potato granules, quantities of pregelatinized starch or other dehydrated products containing a higher proportion of free gelatinized starch must normally be incorporated. Alternatively, during reconstitution, mixing or extrusion, the potato granules can be subjected to sufficient shear to rupture enough potato granule cells to release the required amount of potato starch.

2. Potato Flakes - During the manufacture of potato flakes, a sheet of dehydrated potato cells, approximately 5 cells thick, is broken to reduce the bulk density of the finished product prior to packaging. (See Potato Processing, previous reference, and U.S. Pat. No. 2,780,552 to Willard and Cording.) As the potato flakes are broken to sizes convenient for packaging, the potato cells at the peripheral edges of the flakes are ruptured, permitting potato starch to be released during reconstitution. The following table shows the relationship between the screen size of potato flakes, the ratio of the peripheral edge volume to the total volume, the texture score and the blue value - a method of determination of free starch.

TABLE

EFFECT OF FLAKE SIZE ON TEXTURE SCORE, & BLUE VALUE

| Screen Size (U.S. Std.) | Avg. dia. of Flakes Inches | Ratio, peripheral edge vol. to total vol. | Broken Cells % | Texture Score | Blue Value |
|---|---|---|---|---|---|
| 6–8 | 0.124 | 0.032 | 12.5 | 6.5 | 40 |
| 8–10 | 0.096 | 0.042 | 14.5 | 5.5 | 45 |
| 10–14 | 0.069 | 0.058 | 14.8 | 5.0 | 61 |
| 14–20 | 0.044 | 0.091 | 15.3 | 3.5 | 91 |
| 20–40 | 0.027 | 0.148 | 23.0 | 3.0 | 167 |
| 40–60 | 0.011 | 0.365 | 31.4 | 1.25 | 395 |
| –60 | 0.006 | 0.667 | 70.0 | 1.0 | 590 |

Texture Grade:
7 - excellent, mealy
5 - normal mashed potatoes
3 - sticky, cohesive, beyond normal level of acceptability
1 - extremely sticky, rubbery, pasty, glue-like.
(See Potato Processing, previous reference).

Typical potato flakes prepared as an article of commerce have a random size as follows:

| U.S. Standard Screen Sizes: | |
|---|---|
| +4 mesh | 0.6% |
| +10 | 40.4% |
| +20 | 49.0% |
| +40 | 8.7% |
| –40 | 1.3% |

These flakes contained 21 percent broken cells as measured microscopically by the method of Reeve et al (Food Technology, 1959, No. 10, pages 574–577). When commercial potato flakes are used as the base potato ingredient in the process of this invention, it is not usually necessary to add pregelatinized starch. If potato flakes of very small size, say through 40 mesh, having a larger percentage of broken cells and available gelatinized starch are used as the raw material, the flakes must be blended with other dehydrated products such as potato granules of lower free starch content to reduce puffing during frying.

3. Potato flour is a drum-dried product similar to potato flakes, except that the finished product has been ground to pass through an 80 mesh screen. Essentially all of the potato cells are ruptured, and the presence of the excessive quantity of free gelatinized starch precludes the use of potato flour by itself as a normal raw material for this process. However, potato flour instead of pregelatinized starch can be combined with potato granules or fresh, mashed potatoes to obtain the desired expansion during frying.

4. Diced, dehydrated potatoes are frequently ground into a flour product as a base ingredient for snack manufacture. Use of such ground, dehydrated, diced products is feasible in the process of this invention as long as the relationship of the total free, gelatinized starch is regulated to maintain the expansion during frying within the limits previously stated.

The amount of free available gelatinized starch in the dough at the time of frying is provided in a variety of ways to produce the proper expansion, texture, and structural appearance of the finished product. The amount of free gelatinized starch in the dough can be adjusted by (1) the selection of the ingredients in the dough, (2) the method used to form the dough, (3) the type of extrusion used to form the dough pieces which go into the fryer, or (4) combinations of these factors. The free starch content of various ingredients to be used in the dough can vary. Rupture of potato cells during mixing and extrusion can release additional free starch.

If an insufficient amount of free gelatinized starch is available in the dough at the time of frying, insufficient expansion of the finished product results in an undesirable hard, horny product. If an excessive amount of free gelatinized starch is available in the dough when it goes into the fryer, excessive puffing and expansion of the product causes the final product to separate and either break apart in the fryer, or form a hollow, pillow-shaped, undesirable product. The latter phenomenon is called "puffing" or "pillowing." The proper amount of free gelatinized starch produces a crisp expanded snack product having the structure and texture to be described in greater detail below in conjunction with the drawings.

A determination of the correct amount of free gelatinized starch must be made for each formulation of the dough because of the many factors influencing the absorption of such starches. The absorption, or cohesive power, of the gelatinized starch, whether added as a separate component, or whether present as an adjunct of the cooked potatoes or the dehydrated potato product used in the formulation, can be modified by several factors. For example, during the manufacture of dehydrated mashed potatoes the texture of the finished product is modified by the precooking and cooling treatment (U.S. Pat. No. 2,787,553 to Cording and Willard) which greatly reduces the absorption of the gelatinized starch.

A second factor influencing the absorption of the available gelatinized potato starch present in the dough is the incorporation of various starch-complexing emulsifiers and other such ingredients. For example, the use of monoglyceride emulsifiers such as glycerol monostearate at a level of about 0.5 percent in the manufacture of potato flakes and potato granules is standard for texture improvement of these products. Such emulsifiers can be combined with the dehydrated products used as the raw materials for the products described in this invention, or can be added directly to the dough prior to extrusion in order to offset an excess of gelatinized potato starch, and thus reduce the tendency of the product to puff excessively during frying.

It will readily be seen by one familiar with the art that there are infinite combinations of the various dehydrated potato products, gelatinized or ungelatinized potato starch, treatments such as precooking and cooling used in the manufacture of said products, and starch complexing ingredients which can be incorporated in the dough produced in accordance with the invention described here to control the expansion of the dough during frying.

Examples are provided below to show that the control of the expansion during frying can readily be made in several manners by one practicing this invention, thereby allowing a wide variety of choices of raw materials not hitherto possible in the selection of raw materials for the production of preformed potato snacks. The examples also illustrate that the optimum quantity of available gelatinized starch calculated as a percentage of the total dry ingredients varies according to the nature and absorption of the starch itself.

The color of the finished, fried product is controlled by blending the basic potato ingredient, or mixture of ingredients, with raw potato starch, or other nonbrowning ingredients. Normally, the reducing and total sugar content of dehydrated potato products, whether granules, flakes, flour or dice, is substantially higher than the maximum sugar content permissible in the direct frying of raw potatoes into snack products, such as potato chips or shoestring potatoes. It is therefore necessary to reduce the overall reducing sugar content so that the color of the finished product will resemble that of potato chips. Normally, a mixture of about one-half dehydrated potato flakes or potato granules, and one-half standard raw, ungelatinized potato starch gives an acceptable product color. Use of substantially more raw potato starch reduces the overall potato flavor to a marked degree, and if carried to extreme can produce a less typical mouth feel or texture of the finished product. Increasing the ratio of potato solids to raw potato starch produces a more natural potato flavor within the limitation permitted by product color. Ingredients known to inhibit browning of potatoes during frying, such as sodium bisulfite, can be added to the dough but these products if used in excess tend to hasten the production of free fatty acids and darkening of the frying medium. The frying medium, normally a hydrogenated vegetable shortening, is preferably maintained at 340° F, and at this temperature the products will fry to doneness in one to two minutes, normally 80 to 105 seconds. Higher temperatures and shorter time will produce products of greater crispness, darker color, and less oil content. Frying at lower temperatures reduces color development, but substantially increases the fat absorption of the finished product.

Other features of the process will be evident from the more detailed discussion of the following examples of the process.

DEHYDRATED POTATOES

The quantity of dehydrated potatoes chosen for the process, and the inert starch, such as ungelatinized potato starch, salt and seasoning as desired are mixed with an appropriate amount of water to yield a solids content of the dough between 40 and 50 percent, preferably between 42 and 48 percent. Stirring for one minute in a standard Hobart mixer fitted with a paddle at 60 rpm is satisfactory for complete blending of these ingredients. Following this, a portion of the mixture is placed in an extruder, extruded and, at substantially the original moisture content, dropped direct into cooking fat and fried about 90 seconds.

The potato based dough formed in this invention is normally friable and free-flowing, as mixed, and somewhat putty-like, but not excessively sticky after compression, and can be formed or shaped in many types of standard food shaping equipment. Breakage of potato cells during extrusion, and the resulting release of gelatinized starch, alter the texture and expansion of the fried product, which, if not controlled, could cause excessive puffing. A piston type extruder is one preferred method of forming. Roller sheeting equipment commonly used for macaroni products can be used if care is exercised that excessive cell damage does not occur during extrusion of the dough through the roller apertures. The use of this type extruder permits the continuous mixing of dry ingredients, water and seasonings in one single step along with the extrusion, thereby providing considerable economy of operation.

EXAMPLE 1

The following ingredients were combined and blended in a 5 quart Hobart mixer using a paddle, turning at low speed for 1 minute.

| Ingredients | Grams |
| --- | --- |
| Standard potato flakes made from Idaho Russet potatoes having a screen analysis of 1.5% on 4 mesh (U.S. Standard); 34% on 10; 41.8% on 40; and 8.4% through 40 mesh | 150 |
| Potato starch, standard, unmodified, ungelatinized | 150 |
| Salt | 7 |

During an additional one minute of mixing, 347 ml. of water at room temperature was added.

The mixing was continued on the same low speed for a third additional minute to insure uniform moistening of all components.

This mixture contained approximately 42.8 percent solids, and in this state was friable, but could be shaped into a desired shape by application of pressure such as by squeezing into the shape of a ball with the hand. The mixture was then introduced into the cylinder of a piston extruder. By the application of force from a screw, the piston forced the potato mixture through a die opening 1 inch wide and 36 mil. thick. The extruded dough was smooth and uniform and was cut with a knife into pieces approximately 2 inches long. The pieces fell into a standard laboratory fryer, containing hydrogenated vegetable oil maintained at 340° F where they were fried with gentle agitation for about 90 seconds. At this time they were removed, salted, and found to have a pleasing potato flavor resembling potato chips and a desirable crisp but not hard or brittle texture. The pieces had a slightly curled, attractive appearance and were fully strong enough for dipping in typical flavored dip mixes.

Ten such pieces were broken along a straight edge when measured and were found to have an average thickness of 75 mils. giving a ratio of thickness to the original extrusion thickness of 2-to-1. This is the method of determining "expansion ratio" in subsequent examples. The potato flakes used in this test were examined microscopically using the method of Reeve et al and found to have 21 percent broken cells. The quantity of free gelatinized starch contributed by the potato flakes was calculated by multiplying the dry weight of flakes by 0.21 (the percentage of broken cells) and by 0.72 (the percentage of starch in the flakes). This quantity of free gelatinized starch, 20.8 grams, represented 7.6 percent of the total dry solids in the dough. This calculation and others to follow assumes all of the starch in a broken cell as available starch for binding purposes. The amount of ungelatinized potato starch in the dough is about 47 percent by weight based on the total dry solids present.

EXAMPLE 2

The mixture of Example 1 was extruded through the same aperture set by 30 mil. clearance. The finished product averaged 67 mils. in thickness giving an expansion ratio of 2.2, and was more tender than the product of Example 1 and somewhat more fragile.

EXAMPLE 3

The mixture of Example 1 was extruded through an opening of 42 mils. yielding a product with an average thickness of 89 mils. with an expansion ratio of 2.1, and with a slightly firmer texture.

EXAMPLE 4

To the same mixture of dry ingredients used in Example 1, was added 493 mls. of water at room temperature giving a solids content of 35 percent in the mixture. This dough was too wet and not cohesive enough to be extruded into a smooth, flat shape. Small particles which were fried required three to four minutes for completion of frying which resulted in excessive fat absorption, an oily, greasy taste, and an unnatural texture somewhat resembling pie crust.

EXAMPLE 5

Using the same mixture of dry ingredients as in Example 1, the quantity of water added was decreased gradually to measure the effect on the eating quality and the expansion. ratio of the fried product. At a solids content of 45% in the dough, whether extruded at 30, 36, or 42 mils. thick, the expansion ratio remained at about 2.2 and the products were fully acceptable. At a solids content of 50 percent the expansion ratio at 30 mils. thickness was 1.9, and at 36 mils. thickness, was 2.2. The texture of these products, however, became untypically hard, and the product texture resembled a cracker or other baked product, rather than the typical potato chips prepared from fresh potatoes.

EXAMPLE 6

A mixture of 200 grams potato flakes, 100 grams raw potato starch, and 7 grams salt were combined with 275 mls. of water as described in Example 1, to yield a solids content of 47.5 percent. The quantity of ungelatinized potato starch in this dough was about 31 percent by weight based on the total dry solids present in the dough. (The potato flakes had a solids content of 92 percent by weight, and the potato starch had a solids content of 86 percent by weight.) This product was extruded and fried as described in Example 1 and expanded to 1.7 times the original extrusion thickness. The surface of the fried product was noticeably rougher and the color was somewhat darker than the product of Example 1, but the overall quality was judged excellent. The quantity of free gelatinized starch in this dough calculated in the same manner as described in Example 1 was 27.8 grams or 10 percent of the total solids.

EXAMPLE 7

Mixtures of dry ingredients similar to those in Example 1 were prepared in which potato granules were used to gradually replace potato flakes in the mixtures of the dehydrated potato ingredients. A mixture of 25 grams potato granules, 125 grams potato flakes, 150 grams potato starch, 7 grams salt mixed with 347 mls. of water and extruded and fried as described in Example 1 produced a highly desirable product. When the quantity of potato granules was extended to 100 grams, mixed with 50 grams of flakes, etc., the product extruded nonuniformly and ragged edges were apparent. The finished, fired product had a greasy, oily taste, and a low expansion ratio of 1.4. An additional replacement of flakes with potato granules was tested. The product became completely unworkable.

Microscopic examination of the commercial potato granules used in this example showed 8 percent broken cells. When using 25 grams of the granules in the formulation above the available gelatinized starch was 18.8 grams or 6.85 percent of the total solids. When using 100 grams of granules, the available free starch was reduced to 12.4 grams or only 4.52 percent of the total solids, not enough to provide sufficient expansion of the dough during frying.

EXAMPLE 8

The ingredients of Example 1 were again used to prepare a sample from standard Idaho Russet potato flakes. In this case, the potato flakes were separated into two size fractions using U.S. Standard screens. Two identical mixtures were prepared using in the first case those flakes which passed over the 5 mesh screen and in the second case those flakes which passed beneath the 16 mesh screen. The dough produced from the more finely ground potato flakes was noticeably more cohesive.

The product from the large flakes had a short texture, was somewhat greasy flavored, had a rough appearance and an expansion ratio of 1.6. The product prepared from the fine potato flakes expanded to an average of 1.9 and had excellent texture and uniform appearance. The larger flakes contained 8.2 percent broken cells which reduced the free starch concentration in the final dough to 8.1 grams or 2.96 percent of the total solids. The 16 mesh flakes had 34 percent broken cells which gave 33.7 grams of free gelatinized starch or 12.3 percent of the solids content of the dough.

RAW POTATOES

Raw potatoes are washed, peeled, trimmed and cut into appropriate sizes in a conventional manner prior to cooking. If desired, the tubers may be sliced to approximately one-half inch thickness and subjected to the precooking and cooling treatment previously described to modify the texture of the dough resulting from the subsequent steps of the process. Generally, it is sufficient to slice the potatoes to uniform thickness and cook the slices in atmospheric steam for 25 to 35 minutes, depending on the variety of potatoes and the solids content. The cooked potatoes are mashed by ricing them through conventional equipment using apertures of 1/16 inch to ⅛ inch diameter, by forcing the cooked potatoes through round bars spaced ⅛ inch apart, or by passing them between rotating rollers maintained at a distance of 50 to 75 mils. In any case, the mashed potatoes are allowed to cool to a temperature below the gelatinization point of potato starch, namely, below 140° F. If desired, the cooling is effected by passing cooling water through the mashing rolls, by blowing cold air on the potatoes or by other means known to the art. The cooled, mashed potatoes are mixed with the required amount of standard ungelatinized potato starch and, if desired, additional quantities of either pregelatinized starch or a dehydrated product selected from the group described previously having sufficient free gelatinized starch to provide the cohesiveness required in the extrusion into the product of this invention.

Alternatively, the mashed potatoes can be subjected to a mixing, kneading treatment designed to rupture sufficient quantities of the potato cells to provide the desired cohesiveness in the dough. The mashing and mixing to produce a desired level of cell breakage can be accomplished either before or after the cooling step previously described.

The cooled, mashed potatoes and dry ingredients are blended to form a dough in a suitable planetary mixer or continuous ribbon blender of standard design. At this point the mixed dough is friable, but can be forced into any desired shape by hand manipulation. The dough is extruded and then fried in the same manner as described above in connection with dehydrated potatoes.

The finished product has a full, rich potato flavor and has a thickness approximately 1.6 to 3.0 times the thickness of the extruded dough. The texture can be varied by adjusting the height of the extruder slot, base potato ingredients, and the solids content of the extruded dough to produce products either firmer or more tender than standard potato chips or corn chips. Savory ingredients such as dehydrated onion powder or garlic, barbecue spices and other standard flavoring ingredients such as MSG, salt, etc., can be applied either internally by mixing into the dough prior to extrusion or by dusting on the finished product after frying.

EXAMPLE 9

Russet Burbank potatoes were peeled, sliced into ½ inch thick slices, steamed for about 30 minutes, and riced through a conventional kitchen ricer with 1/16 inch round holes. After cooling to room temperature (75° F), 750 grams of the riced potatoes (having a solids content of about 20 percent by weight) were combined with 363 grams of regular ungelatinized potato starch (having a solids content of 88 percent by weight) and 7 grams of salt and mixed for 1 minute on low speed to completely blend the ingredients. This material had an average solids content of 42.5 percent by weight. The amount of ungelatinized potato starch in the dough was about 67 percent by weight of the total dry solids present. The dough was extruded as described previously, but the dough lacked sufficient cohesiveness to adhere in a continuous strip. Several small filaments of fried product were obtained which showed an expansion ratio of 1.3 and an undesirably hard texture. A portion of the mixture was examined microscopically and found to contain about 4 percent broken potato cells. The percentage of free gelatinized starch in the dough was calculated as 0.94 percent.

EXAMPLE 10

The mixture of Example 9 was then agitated at high speed for an additional 5 minutes. The character of the mash remained loose and friable and microscopic examination revealed 4.4 percent broken potato cells. The mixing was then continued for a total of 8.25 minutes at which point a rapid, noticeable increase in cohesiveness was observed and the mixer immediately stopped. A portion of the dough was extruded through a 36 mil. aperture and fried to produce a highly satisfactory snack product with an expansion ratio of 2.5. Microscopic examination of this dough indicated 13.8 percent by weight of the potato cells had been ruptured. At this stage the dough then contained 3.24 percent by weight of free gelatinized starch based on the total solids.

EXAMPLE 11

A final portion of the dough remaining from Example 10 was beaten for an additional 45 seconds at which point the character of the dough changed to a very cohesive, bread-like dough which when extruded and fried produced abnormally puffed, pillowed products not resembling potato chips or other conventional snack items. The expansion ratio of several of these was 4.7, although most were in a completely rounded shape. Microscopic examination of the dough indicated that 55 percent by weight of the potato cells were now ruptured, resulting in a 13.0 percent by weight free gelatinized starch concentration of the solids in the dough.

EXAMPLE 12

The following ingredients were combined and blended in a 5 quart Hobart mixer using a paddle, turning at low speed for 1 minute.

| Ingredients | Grams |
| --- | --- |
| Cooked, riced potatoes prepared as described in Example 1, cooled to 100° F. | 375 |
| Potato starch (regular ungelatinized potato starch) | 160 |
| Pregelatinized, dried potato starch | 5 |
| Potato flakes, ground to pass an 80 mesh sieve | 8 |
| Salt | 10 |

No additional water was required in this mixture as the moisture content of the original potatoes contributed sufficient to result in an overall solids content in the finished mixture of 42.9 percent. The mixing was continued on low speed for three minutes to insure uniform distribution of all components. This mixture, very similar to that of Example 1 in consistency, was extruded through a 36 mil. slot and fried at 340° F for one minute. The finished product had an expansion ratio of 1.9, and a distinctive potato chip flavor identity.

Example 12 shows that the desired dough characteristics can be obtained using mixtures of various potato ingredients and that the free starch used for binding and adjusting texture can be derived from fresh potatoes, plain pregelatinized starch and finely ground, dehydrated potatoes in the same formulation.

It will be noted also in products made from fresh potatoes the actual quantity of free gelatinized starch on a weight basis is less than products made from dehydrated mashed potatoes. For example, the dough used in Examples 1, 6, and 8 contain respectively 7.6 percent, 10 percent, and 12.3 percent free gelatinized starch contributed by the broken potato flake cells. In these products the starch had been retrograded during processing by a precooking and cooling treatment. The presence of 0.5 percent monoglyceride emulsifier formed a complex with the available amylose of the potato starch additionally reducing the absorption and, in the case of this invention, required a relatively high level of available free gelatinized starch to achieve the desired expansion. In Example 10 a concentration of only 3.24 percent of free gelatinized starch derived from plain, cooked, riced potatoes gave the desired expansion. In Example 12 where cooked, riced potatoes containing 4 percent broken cells were combined with pregelatinized potato starch and potato flakes the total quantity of 12 grams of available gelatinized starch represented 5.1 percent of the total solids in the mixture.

ONION-FLAVORED RINGS

EXAMPLE 13

To make a simulated fried onion ring product, the following dry ingredients were combined and blended in a Hobart mixer using a paddle turning at low speed for 1 minute.

| Ingredients | Grams |
| --- | --- |
| Standard Idaho Russet potato flakes having a screen analysis (U.S. Std.) of 1.5% on 4 mesh; 34% on 10; 41.8% on 40; and 8.4% through 40 mesh | 125 |
| Potato starch (Std. unmodified and ungelatinized) | 175 |
| Salt | 7 |
| Onion powder (dry) | 15 |
| Water | 355 |

After the dry ingredients were mixed for one minute, the water was added during an additional minute of mixing, and mixing was continued at the same low speed for a third additional minute to insure uniform wetting of all the ingredients.

The dough was extruded through an annular slot 1/16 inch wide, and cut into rings about 1/16 inch thick. The rings were dropped into a standard laboratory fryer containing hydrogenated vegetable oil at 330° F, and fried with gentle agitation for about 3 minutes. The final product expanded to simulate the texture of a fried onion ring.

Replacing part of the regular ungelatinized potato starch in Example 13 with pregelatinized potato starch in the amount of 3 grams, 6 grams, 12 grams, and 24 grams of free gelatinized starch produced an improved product with each increase of the free pregelatinized starch. In the final example in which 24 grams of ungelatinized starch were replaced by gelatinized starch, the final fried product was the most tender of the group and had noticeably more fat absorption than the others which is desirable in the case of simulated fried onion rings. At no time was there any undesirable excess puffing noted such as occurred with the flat extruded pieces when the level of free gelatinized starch became too great.

EXAMPLE 14

The following ingredients were blended exactly as described in Example 13, extruded through a ring die and fried for 3 minutes at 330° F.

| Ingredients | Grams |
| --- | --- |
| Potato flakes | 125 |
| Regular potato starch | 158 |
| Pregelatinized potato starch | 20 |
| Fat (hydrogenated vegetable oil) | 15 |
| Salt | 7 |
| Onion powder | 5 |
| Onion flavoring | 3 |
| Water | 440 |

This product had an expansion ratio of 2.1 and was one of the best produced as an onion-flavored ring snack.

The same dough of Example 14 was extruded through the standard flat die at 36 mils thickness and fried at 330° F. All of the flat samples puffed excessively, and were unacceptable as a simulated potato chip snack. This indicated the correct amount of free gelatinized starch for one shape, say an annular ring, is not necessarily the right amount for another shape such as a flat strip. Apparently there is more tendency for the sides of flat strips to push apart than in the case of the more compact ring shape.

POSITION OF EXTRUDER

If straight strips are extruded vertically into the fat, the finished strips are practically straight after frying. If, however, the extruder is mounted to extrude the strips horizontally or at a substantial angle to the vertical, the product after frying assumes a curved shape which is more desirable in simulating a potato chip. Preferably, the extruder is mounted to extrude strips into the cooking fat at an angle of about 45° to the vertical. This imposes sufficient curvature on the finished fried product and also allows multiple extrusions to fall into the cooking fat without sticking together.

The foregoing examples show that the geometry of the extrusion, whether a flat strip or an annular ring, must be taken into consideration with respect to the amount of free gelatinized starch present to get a product within the extremes of a hard, compact unpuffed one on one hand, and one which has expanded excessively on the other. In any event, the examples disclosed herein clearly demonstrate how to adjust the amount of free gelatinized starch to produce, on frying, a texture that simulates potato chips or onion-flavored rings.

USE OF EMULSIFIERS IN DOUGH MIX

A quantity of emulsifiers can be added to the dough mixture prior to extrusion. The emulsifier improves lubrication of the dough as it passes through the die, which prevents additional cells from being ruptured. This reduces the free starch content in the dough at the time of frying, and can prevent the dough pieces from puffing when fried. Thus, the emulsifier allows a dough of higher solids content to be used when compared with the instance where no emulsifier is used.

EXAMPLE 15

A commercial piston extruder manufactured by Heat and Control, Inc. of South San Francisco, was used to manufacture snacks of this invention on a continuous basis. The products were extruded through the four annular dies located in the bottom plate of the 8-inch diameter cylinder containing the dough which was forced under approximately 500 psi pressure. The outer diameter of the annular shaped opening measured 0.625 inch, and the thickness of the dough was 0.040 inch.

The combination of ingredients for extruding this product on a continuous basis was as follows:

| Ingredients | Grams |
| --- | --- |
| Potato flakes | 202 |
| Potato granules | 225 |
| Raw potato starch | 277 |

-continued

| Ingredients | Grams |
| --- | --- |
| Salt | 16.5 |
| Pregelatinized potato starch | 7.2 |
| Water | 615 |

2.6 grams of glycerol monostearate emulsifier was added to the mixture prior to extrusion.

The dough had a solids content of 48 percent by weight of the total solids and water present.

Because of the high extrusion rate used for economical operation of this equipment, it was found best to increase the solids content to 48 percent and include the additional glycerol monostearate as indicated above in the formulation to produce a well shaped product and to reduce puffing of the product. Under these conditions a product having excellent texture and appearance was produced on a consistent basis. A rotating knife cutter was used to cut the products to an average length of 7/16 inch with a length variation of only 1/8 inch.

USE OF ROLLER FORMING EQUIPMENT

The process of forming the dough pieces in preparation for frying can be carried out by roller forming. For example, a cohesive dough is rolled into a thin sheet and cut to form a narrow, elongated product similar to the shoestring snack prepared from fresh potatoes. To avoid scorching the interior of the narrow pieces, an expansion ratio as high as 4.5-to-1 has been used, as shown in the following example. Products made from dough pieces wider than about ¼ inch puff excessively when using the same formulation. Extrusion of the same dough through a piston extruder would also result in an excessively puffed product.

The shoestring product is a special illustration of the control of expansion afforded by the invention in which a high level of gelatinized starch is used in the dough to make the relatively narrow, elongated strip of dough expand intentionally to an expansion ratio of between about 3 and 4.5-to-1. Products wider than about ¼ inch made by piston extrusion, roller forming, or other means are limited to an expansion of about 3.0-to-1 maximum, as any greater amount of expansion results in the sides of the product separating, producing a large internal void.

EXAMPLE 16

A dough was prepared by mixing ingredients described in Example 1. The dough was first rolled into a sheet of about ¼ inch thickness using a hand operated Pasta roller. The sheet was then rolled by the controlled aperture stainless rollers to a thickness of about 0.036 inch. From this sheet of dough, strips were then cut about ¼ inch wide and 3 inches long.

1. The products formed from the dough of Example 1 had a thickness of only 0.060 inch and an expansion ratio of 1.7-to-1. This product was too thin, slightly hard, and extremely curled.

2. Five grams of pregelatinized starch were added to the dough. This product expanded to 0.067 inch, i.e., an expansion ratio of 1.9-to-1, and had a satisfactory texture.

3. Ten grams of pregelatinized starch were added to the dough of Example 1, after which frying expanded the product to 0.085 inch with good texture.

4. The same dough as Example 1 was mixed at medium speed during reconstitution for 5 minutes. At this point there was a noticeable change in the character of the dough as it changed from a friable damp mixture to a more cohesive, lumpy material. This product was rolled, cut and fried, expanded to 0.073 inch, i.e., an expansion ratio of 2.0-to-1, and yielded a product of good flavor and texture.

EXAMPLE 17

Shoestring snacks were prepared as described in Example 16 from the following ingredients:

| Ingredients | Grams |
| --- | --- |
| Ground potato flakes(−20 mesh) | 110 |
| Potato granules | 40 |
| Potato starch | 150 |
| Salt | 7 |
| Water | 360 |

Preliminary experiments indicated that a greater degree of cohesiveness was required in the dough, compared to piston extrusion, to facilitate handling and cutting in the rollers. For this reason a lot of Idaho Russet flakes ground to pass a 20 mesh sieve, was used. The screen analysis of these flakes was:

| On 20 mesh | 4.7% |
| --- | --- |
| On 48 mesh | 16.7% |
| On 60 mesh | 25.6% |
| Through 60 mesh | 50.8% |

Products extruded in the range from 0.030 inch to 0.050 inch expanded to the range of 3.0 to about 4.1-to-1. The texture and flavor of these products was highly desirable. Some separation of the product in the center was noted, particularly with the thicker products. Because of the narrow dimension, ¼ inch, the product could not separate completely into a puffed condition. The product was slightly rounded on the flat ¼ inch wide sides. About 40 percent of these products were curled during handling and frying. It was noted that the thicker products had a less scorched flavor. A sample of the product made from dough sheeted to 0.042 inch thick was broken open, and it was noted that the interior portion was not uniformly brown. The thicker product had a brown exterior with a light colored interior, giving a product with overall less scorched flavor, which was judged more desirable by the panel.

The same dough was used in a piston extruder to produce a cylindrical product with ⅝ inch diameter at a thickness of 0.0315 inch. The product expanded to 2.9 times this original dimension, but the shape was not consistent, the edges were ragged, and many of the pieces were puffed.

Another sample was extruded in the piston extruder through a 1 inch wide by 0.036 inch wide rectangular slit. All products puffed, and absorbed excessive grease.

A portion of the same dough was rolled in the Pasta roller to a thickness of between 0.030 inch and 0.036 inch, and cut into rectangular pieces measuring 1 inch by 2 inches. When fried under the same conditions, these products expanded with a ratio of 2.9-to-1. Some puffing was noted, but not to the same extent as to the pieces extruded through the piston extruder.

EXAMPLE 18

A commercial corn chip double roll extruder was used to make the snack product of this invention. A model TC-500 forming unit, made by the J. C. Ford Company, Monterey Park, California, was set at an opening of about 0.030 inch clearance. A quantity of 20 pounds of dry ingredients was mixed with the appropriate amount of water in a 60 quart Hobart mixer, according to the following formulation:

| Ingredients | Grams |
|---|---|
| Potato flakes (unground) | 125 |
| Potato granules | 25 |
| Raw potato starch | 150 |
| Pregelatinized potato starch | 5 |
| Water | 365 |

The solids content of this dough mixture was 41.5 percent by weight of the total solids and moisture in the dough. This dough was introduced between the 4-inch diameter rollers by a standard Masa feeder which uses a single screw extruder to produce an extrusion of dough 13 inches wide, approximately ½ inch thick. The extruded sheet of dough was divided into rectangular shaped products, 1 inch by 1.5 inches, by means of a metal die which pressed against the forward rotating roller. Pieces of dough were conveyed by a standard flat chain conveyor and later fried to produce an acceptable snack product with an expansion ratio of about 3.0-to-1.

EXAMPLE 19

A dough having the same composition as that of Example 17 was also processed in the J. C. Ford roller extruder. This dough was quite sticky and some difficulty was encountered in removing the dough from the rollers. Several flat pieces were obtained, however, which when cut into ¼ inch wide sections and fried, yielded a shoestring product having an expansion ratio of about 4.0-to-1 with excellent texture and flavor.

EFFECTS OF REPLACING POTATO STARCH WITH MISCELLANEOUS INGREDIENTS

Preferably, a pure raw starch, rather than a flour, is used as the raw ungelatinized starch component of the dough. The physical character of raw starch, especially raw potato starch, imparts desirable texture and appearance to the fried product, in addition to providing a binder which limits expansion of the product beyond the point where undesirable puffing would occur.

EXAMPLE 20

Experiments were conducted to observe the effect of replacing the raw potato starch normally used in the potato snack dough with various food starches and flours such as corn starch, corn flour, wheat flour, wheat starch, tapioca starch and rice flour.

A hand operated piston extruder was used, and the extruded product was fried at 340° F. All products were extruded through a 1-inch wide rectangular die set at 0.036 inch.

The basic formulation used for these tests were as follows:

| Ingredients | Grams |
|---|---|
| Potato flakes (standard) | 125 |
| Potato granules | 25 |
| Test ingredients | 150 |
| Pregelatinized potato starch | 2 |
| Salt | 7 |
| Water | 330 |

EVALUATION:

1. Puffing. Any piece showing definite puffing was segregated. The total weight of puffed pieces was expressed as a percentage of the total product.
2. Thickness. Ten non-puffed samples were broken along the straightest axis possible. Three measurements along this break were made with a thickness gauge and averaged.
3. Expansion Ratio. This ratio was determined by dividing the average thickness of the product by the die opening.
4. Fat Analysis. The amount of fat pickup by the product was measured by Soxlet extraction at Hibbs Laboratory, Boise, Idaho.
5. Color. Coloration was determined by comparison with The Potato Chip Institute Chart (scale 1 through 9; no. 1 is lightest, practically white, no. 5 is average potato chip, no. 7 is dark potato chip, still acceptable, no. 8 very dark potato chip, generally not acceptable, no. 9, extremely dark).
6. Flavor Grade. Flavor was tested by an expert panel (1 - excellent, 2 - good, 3 - fair, 4 - poor (not acceptable for commercial use), 5 - very bad). Flavor grades are based on overall desirability of the snack flavor related to other potato snack products. Resemblance to the potato flavor of fresh potato chips is the arbitrary standard.
7. Appearance Grade. Appearance of the product was determined by a visual test by an expert panel. (1 - excellent, 5 - very bad, as above in paragraph 6.)
8. Texture Grade. The texture of the product was tested by tasting and finger-breaking using an expert panel. Grades were the same as those in paragraphs 6 and 7 above.

The test results were as follows:

| Test Ingredient | Corn Starch | Corn Flour | Wheat Flour | Wheat Starch | Tapioca Starch | Rice Flour | Potato Starch |
|---|---|---|---|---|---|---|---|
| EVALUATION: | | | | | | | |
| Puffing % | 44 | 0 | 32 | 43 | 17 | 1 | 10 |
| Avg. thickness | 62 | 49 | 59 | 60 | 85 | 53 | 74 |
| Expansion Ratio | 1.72 | 1.36 | 1.64 | 1.67 | 2.36 | 1.46 | 2.06 |
| Fat Analysis % | 29.2 | 29.9 | 38.6 | 27.8 | 28.0 | 33.7 | 26.2 |
| Color | 5 | 8 | 5 | 7 | 5 | 7 | 5 |
| Flavor Grade | 3 | 4 | 3 | 3 | 2 | 4 | 1 |
| Appearance Grade | 3 | 5 | 4 | 4 | 1 | 4 | 1 |
| Texture Grade | 3 | 5 | 3 | 4 | 2 | 4 | 1 |

The product made with potato starch received the highest rating generally because of its excellent potato flavor, uniformly good appearance and texture, and low fat absorption.

The product made with tapioca starch was the only other product which approached commercial acceptability. Compared to the potato starch product, however, it was inferior because of its lower level of potato flavor. Potato starch and tapioca starch have a high initial viscosity on gelatinization. It is believed that this characteristic ability of the starches to bind the water molecules tightly in the starch gel formed during frying accounts for the superior structure, appearance, and flavor of the finished product when these ingredients are included in the formulation.

Products with corn flour and rice flour were similar, having a low expansion, dark color, and high fat absorption. In contrast, the product made with wheat flour was softer, expanded slightly more, and had a fair texture and sweet distinctive flavor, but did not resemble a potato chip. The product made with wheat flour puffed objectionably, and had a mottled appearance which would reduce its value as a snack product.

Products made with corn starch and wheat starch puffed excessively, appeared grease-soaked, and had a bland flavor.

NOVEL STRUCTURE OF THE FRIED PRODUCT

The method of this invention produces an expanded potato snack product having a novel structure. The structural characteristics of the fried product of this invention are understood best in the context of a comparison with the internal structure of other prior art potato snack products. FIGS. 1A through 1I show photographic replicas of the internal structure of various prior art potato snack products. These products were broken across a straight line to expose their internal structure which was then photographed to give a final enlarged view at 50x to 100x.

FIG. 1A shows the internal structure of a potato snack 10 made by the dry collet process in accordance with the teachings of the Gerkens and Speiser patents referred to above. This product is expanded by short immersion in hot cooking oil to produce a highly expanded product having relatively large pores 12 throughout the body of the product.

FIG. 1B shows a potato snack 14 made by dry extrusion of potato ingredients and sold under the trademark Crispy Taters. This product expands greatly into a fluffy snack product characterized by a fibrous structure 16 which entraps relatively large pores 18 present throughout the body of the product.

Figure 1C:
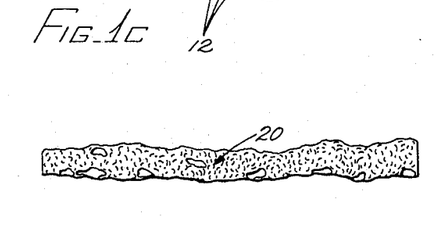
Figure 1D:
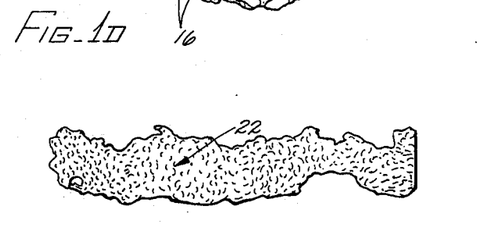
Figure 1E:
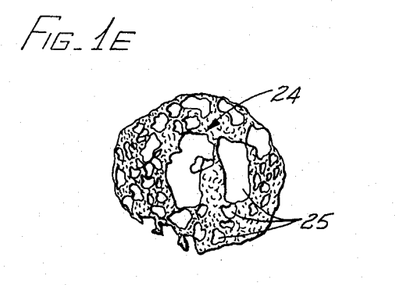

FIG. 1C shows a cross-section of a typical potato chip 20 made by frying a freshly sliced potato in hot cooking oil for 3 to 4 minutes. The product exhibits a generally uniform structure of dehydrated potato cells in their original natural configuration.

FIG. 1D shows the internal structure of a potato product 22 sold under the trademark Viko Chips. The product is made by extrusion of a dough containing dehydrated potatoes and wheat flour, combined with minor amounts of rice flour and corn flour, with a solids content of about 55 percent. There is little expansion of the product during frying so the internal structure exhibits substantially no internal voids.

FIG. 1E shows a "potato straw" 24 made by the process disclosed in the British patent to Bibby referred to above. In this process potato solids derived either from freshly masked potatoes or dehydrated potatoes are mixed with a major quantity of potato starch to form a dough having between about 30 to 40 percent solids. The dough is extruded through a round opening and fried, and minimal expansion occurs during frying. Substantially the entire interior of the product is filled with small voids 25 filled with fat, with substantially no outer structure other than a thin peripheral dehydrated surface skin.

Figure 1F:
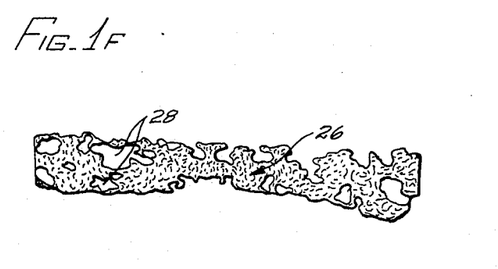

FIGS. 1F through 1I illustrate prefabricated potato chips made from high solids content dough mixtures in which the solids range is about 60 to about 70 percent by weight. FIG. 1F shows the internal structure of a product 26 made in accordance with the process disclosed in the patent to Benson referred to above. This product is characterized by relatively large external voids 28.

Figure 1G:
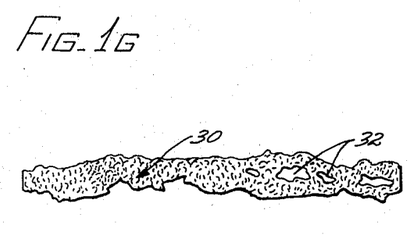

FIG. 1G shows a cross-sectional view of a potato snack product 30 made in accordance with the process disclosed in the patent to Liepa referred to above. This product has a relatively soft texture when compared with the crisp texture characteristic of the products of the present invention. Moreover, the Liepa product exhibits a relatively continuous nonporous internal structure, with the exception of random internal voids 32 produced by puffing of the product during frying.

Figure 1H:
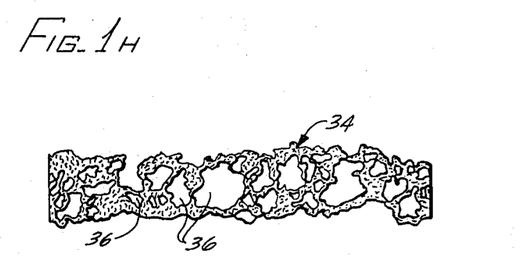

FIG. 1H shows the internal structure of a potato snack 34 produced according to the process disclosed in the patent to Loska referred to above. In this process a mixture of dehydrated diced potatoes, ground into a fine flour, is mixed with ungelatinized potato starch and water to form a dough having a solids content of about 55 percent. The dough particles are then gelatinized by passing them through a steam atmosphere held at a high enough temperature so that all the starch in the dough is gelatinized. These separate dough particles are then dehydrated and later fried to form the expanded structure illustrated in FIG. 1H. The structure of this product exhibits a soft bite, and randomly oriented pores 36 throughout its cross-sectional area.

Figure 1I:
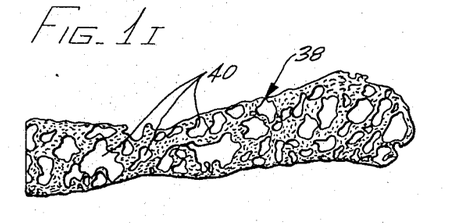

FIG. 1I illustrates a cross-section of a product 38 made in accordance with the process described in the patent to Fast et al referred to above. This product is made from a high solids content (71.5 percent solids) mixture of dehydrated potatoes and water which is gelatinized by the action of a single screw extruder resulting in a formation of a pellet of dough-like material which is cut, flattened between rollers, dried, and later fried. The structure of the fried product has uniformly distributed pores 40 throughout.

Figure 2:
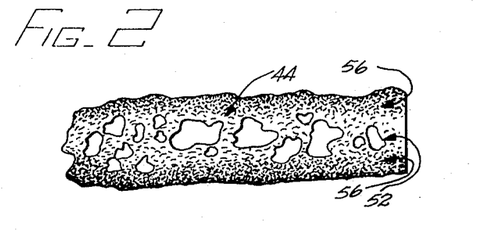
FIG. 2 is a cross-sectional elevation view showing the internal structure of a fried potato snack made by the process of this invention from a cylindrical shaped dough piece.
Figure 3:
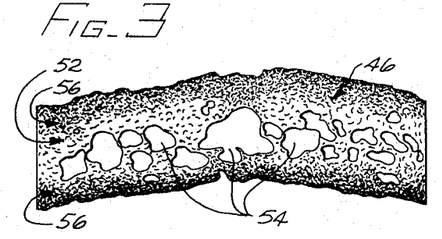
FIGS. 3 and 4 are cross-sectional elevation views of fried potato snacks made by the process of this invention from different strip-like dough pieces.
Figure 4:
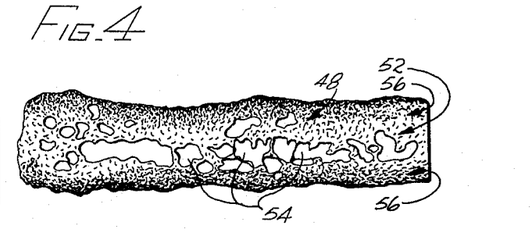

FIGS. 2 through 5 show the internal structure of products made in accordance with the process of the present invention. FIG. 2 shows a portion of a snack 44 which is prepared from a cylindrical shaped dough piece. FIGS. 3 and 4 show various views of snacks 46 and 48, respectively, prepared by frying relatively flat dough strips. In each instance a major portion of the product's cross-section exhibits an internal layer 52 having a relatively continuous line of pores 54 sandwiched between two relatively dense outer layers 56 which are substantially nonporous. That is, the product is characterized by a cellular interior similar to other totally expanded snacks enclosed by a dense outer layer similar to potato chips.

It has been found that the outer layer 56 of the finished product has a relatively constant wall thickness independent of how the piece was extruded or its degree of expansion. The wall thickness is generally in the range of about 0.025 to about 0.037 inch, which is approximately one-third to two-thirds the thickness of a potato chip. Generally the preferred final total thickness of the snack product is within the range of about 0.065 to 0.100 inch, for example, about 0.072 inch. The outer layers of 0.025 to 0.037 inch thickness are then approximately each one-third of the total thickness of the snack piece, with the inner porous layer occupying approximately the center one-third. The result is a snack which captures the potato flavor of potato chips, but which has a unique texture and appearance, and produces a crunchy sensation when chewed.

Aside from the advantage of a crisp texture, the relatively dense outer layer of the snack provides other unexpected advantages. Breakage is reduced during packaging and shipment. The rate of water diffusion from a high humidity atmosphere is slower than with open porous snacks. Thus, the snack product of this invention has a longer shelf life under equivalent conditions. Moreover, the smooth continuous outer surface has a pleasant mouth feel, since it produces no sharp edges or rough surfaces which are characteristic of many other fabricated potato snacks.

EXAMPLE 21

Figure 5:
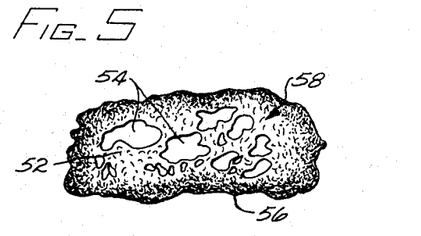
FIG. 5 is a cross-sectional elevation view showing a fried potato snack made by the process of this invention from a relatively narrow strip-like dough piece.

The outer layer 56 of several types of potato snacks made in accordance with this invention were measured to determine their wall thickness. The following table shows the wall thickness of (1) relatively wide strips (measured at their center), (2) relatively wide strips (measured at their edge), (3) relatively wide strips which puffed, (4) cylindrical products extruded through an annular opening in the extruder die, (5) a cylindrical product which puffed, and (6) relatively narrow strips (shoestring products). Wall thickness was measured by separating each snack along the line defined by its porous interior, and measuring the thickness of the remaining dense outer layer with a micrometer.

was expanded to approximately 4.0 times its original dimension. This product exhibits the characteristic inner void structure with the outer dense layer.

EXAMPLE 22

FIGS. 6A through 6E illustrate how the solids content of the dough significantly alters the appearance and structure of the potato snack of this invention. This analysis shows that the 40 to 50 percent solids content of the dough is critical in producing good expansion, together with the novel structure characteristic of the present potato snack product.

The products shown in FIGS. 6A through 6E were prepared by the following formulation:

| Ingredients | Grams |
|---|---|
| Potato flakes (minus 20 mesh) | 110 |
| Potato granules | 40 |
| Raw potato starch | 120 |
| Salt | 7 |

These ingredients were added to specific amounts of water to produce five dough mixtures containing 35, 40, 43, 50, and 55 percent solids by weight. All of these products were extruded through the same piston extruder fitted with the same ⅝ inch outer diameter die with a slit width of 0.035 inch. Representative samples of each run were broken open and photographed with a photomicrograph to exhibit their internal structure shown in FIGS. 6A through 6E.

Figure 6A:
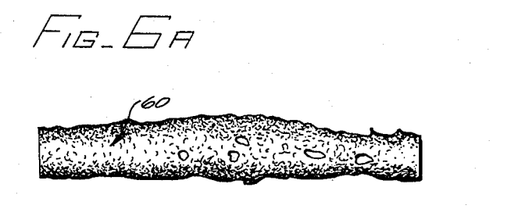
FIGS. 6A through 6E are cross-sectional elevation views illustrating the effect on the internal structure of the fried potato snack of this invention when the solids content of the dough varies from 35, 40, 43, 50, to 55 percent, respectively.

FIG. 6A shows a snack 60 prepared from a dough having 35 percent solids. The dough was soft and the cylindrical structure collapsed during frying. Furthermore, there was no separation of the two sides of the snack product, and there were substantially no internal voids.

Figure 6B:
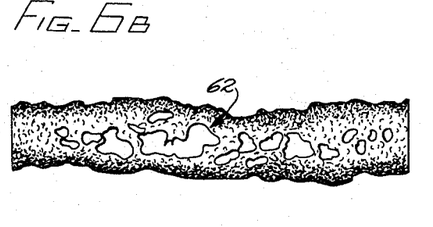

When the solids content was increased to 40 percent, a fried product 62 typical of the products obtained by

| | Product | Overall Thickness (in.) | Extruded Thickness (in.) | Expansion Ratio | Wall Thickness (in.) |
|---|---|---|---|---|---|
| (1) | Wide Strips (center) | .094 | .036 | 2.6 | .028 |
| | | .077 | .036 | 2.1 | .029 |
| | | .086 | .036 | 2.4 | .032 |
| (2) | Wide Strips (edge) | .071 | .036 | 2.0 | .028 |
| | | .067 | .036 | 1.9 | .033 |
| | | .067 | .036 | 1.8 | .033 |
| (3) | Wide Strips (puffed) | — | .036 | — | .028 |
| | | — | .036 | — | .028 |
| (4) | Cylinder (normal) | .072 | .035 | 2.1 | .026 |
| | | .070 | .035 | 2.0 | .030 |
| | | .074 | .035 | 2.1 | .031 |
| | | .068 | .035 | 1.9 | .034 |
| (5) | Cylinder (puffed) | — | .035 | — | .031 |
| (6) | Narrow Strips | .101 | .036 | 2.8 | .037 |
| | | .118 | .036 | 3.3 | .030 |
| | | .090 | .036 | 2.5 | .027 |

Thus, the finished product is characterized by a relatively well-defined outer layer having a thickness in the range of about 0.025 to about 0.037 inch, independent of the method used to extrude the product prior to frying or the product's degree of expansion.

FIG. 5 shows the internal structure of a shoestring type product 58 cut from a strip of dough prepared in accordance with the process of this invention. The dough piece was 0.036 inch thick and ¼ inch wide and the process of this invention was produced. This product is shown in FIG. 6B.

Figure 6C:
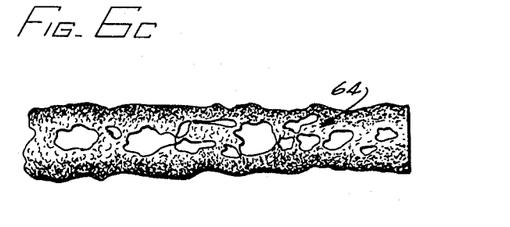

When the solids content of the dough was increased to 43 percent, a product 64 shown in FIG. 6C was produced. This product exhibited a greater expansion ratio than the product of FIG. 6B, the expansion ratio being about 2.3-to-1. The texture and appearance of the product was judged superior to any other produced during this experiment.

Figure 6D:
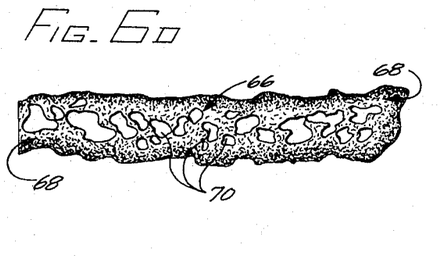

FIG. 6D shows a snack product 66 produced from a dough having a solids content of 50 percent. This product exhibited the characteristic dense outer layers 68, but the product was not expanded as much as the product of FIG. 6C, and thereby produced fewer and smaller internal voids 70. This product did not expand much in frying, and the texture also was noticeably tougher than the product shown in FIG. 6C. The product was borderline as far as a commercially acceptable snack product is concerned.

Figure 6E:
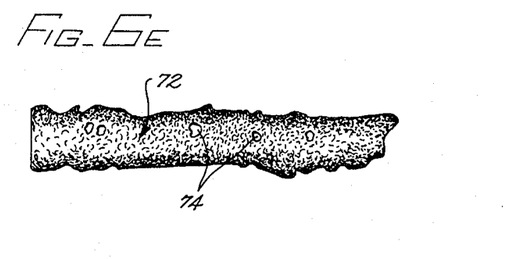

When the solids content of the dough was increased to 55 percent solids, a finished product 72 shown in FIG. 6E was misshapen on extrusion and did not expand into the typical shape of the snacks made by this invention. There were few minute voids 74 scattered throughout the internal layer of the product.

Fat Content

The fat content considered most desirable for a fried potato snack product is in the range of about 25 to about 35 percent by weight. A potato snack product having a higher fat content than about 35 percent is greasy, and the excess fat tends to mask the potato flavor of the snack product. A potato snack having a lower fat content than about 25 percent generally is too hard and therefore difficult to chew.

EXAMPLE 23

The following table lists the results of an analysis of fat absorption as a function of the moisture content in the dough prior to frying. The solids content of the dough was varied as in Example 23 above, and the fat content of each snack was measured after the snack was removed from the fryer and drained.

| Solids Content (%) | Fat Content (%) |
| --- | --- |
| 35 | 51.3 |
| 40 | 33.9 |
| 43 | 26.2 |
| 50 | 23.8 |
| 55 | 22.5 |

Thus, the 40 to 50 percent solids content of the dough is critical in producing a finished product having the desired fat content necessary to produce a commercially acceptable potato snack.

Use of Recovered Potato Starch

The snack product of this invention can be made from dehydrated potatoes or cooked mashed potatoes and ungelatinized potato starch recovered from a potato chip slicing operation. In this instance the potato starch is not dried, but is added to the mashed potato ingredients after recovery from the potato chip process.

Figure 7:
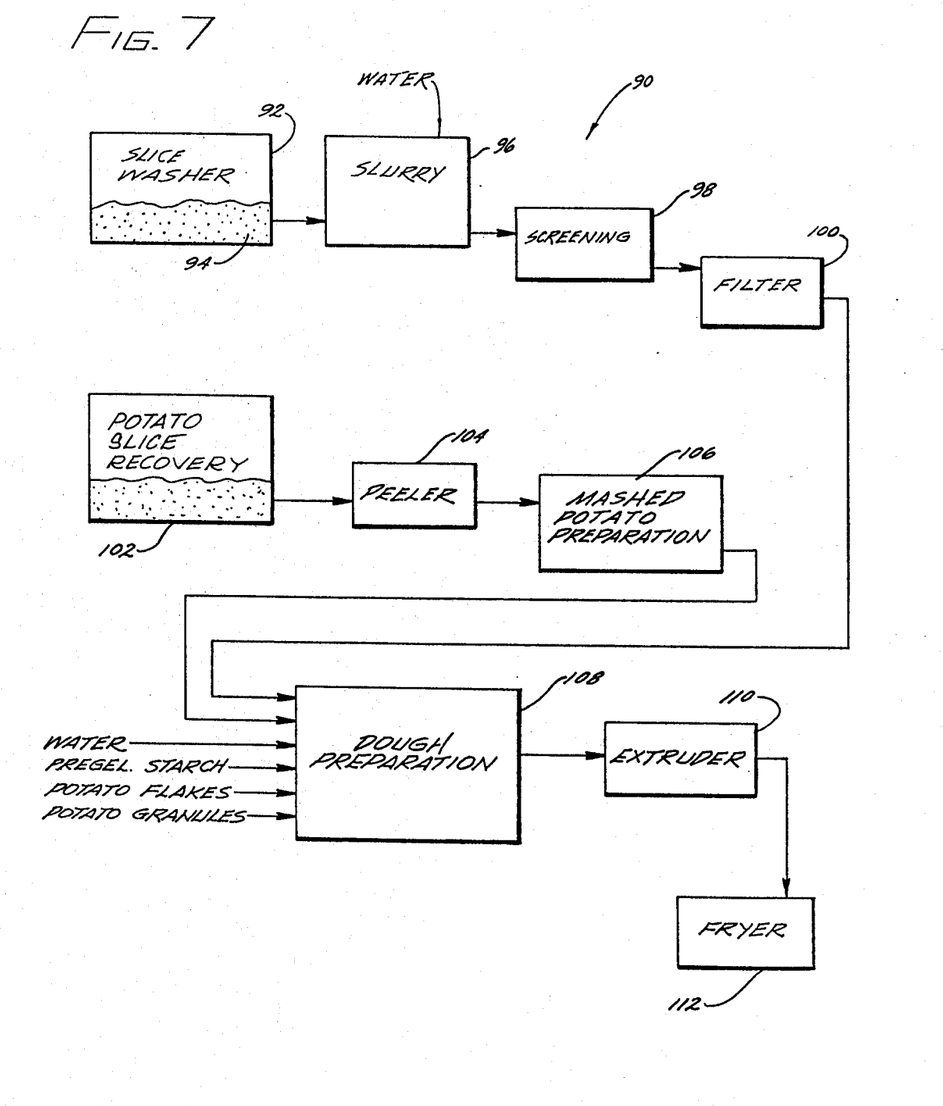
FIG. 7 is a schematic block diagram illustrating a method of using recovered potato starch in the process of this invention.

Referring to FIG. 7, a potato chip processing plant 90 includes a slice washer 92 in which large quantities of raw ungelatinized potato starch 94 accumulate. This starch is a waste product and generally creates a disposal problem.

In the method shown in FIG. 7, potato starch 94 is removed periodically from the washer and fed to a slurry tank 96 where it is reslurried in water. The potato starch slurry is then fed to a U.S. 40 mesh sieve screen 98 to remove potato solid particles. The starch which settles in the screening operation is then fed to a filter 100 which filters the starch to remove excess water, thereby producing a fairly clean, partially dewatered, starch product.

The plant shown in FIG. 7, may also include a system for using cooked fresh potatoes in the snack process in conjunction with the recovered potato starch if desired. Potatoes 102 are peeled at 104, and cooked and mashed at 106, after which they can be used in the dough preparation according to this invention. Additional economy can be afforded by thus utilizing small potatoes unsuitable for the manufacture of potato chips and which have no other economical use.

The purified damp starch produced at filter 100, together with the mashed potatoes produced at 106, are then fed to a dough preparation station 108, either separately or together, where they are added to water, pregelatinized starch, potato flakes, and potato granules to form the potato-based dough of this invention. The dough is then fed to an extruder 110 for extruding dough pieces into a fryer 112 to produce the finished product of this invention.

EXAMPLE 24

Purified damp starch obtained by the recovery method described above was added to water and potato solids to form a dough having about 43 percent moisture by weight. The dough was prepared from the following ingredients:

| Ingredients | Grams |
| --- | --- |
| Potato flakes | 125 |
| Potato granules | 25 |
| Wet starch (49% solids) | 270 |
| Pregelatinized potato starch | 2 |
| Salt | 7 |
| Water | 227 |

After mixing for about 2 minutes in the standard manner, the dough was extruded in the standard manner and an excellent product resulted.

The product made by this method had an improved flavor over standard products made with dry ungelatinized potato starch.

Moreover, it was found that the recovered wet starch used in this experiment contained 0.25 percent protein on a moisture-free basis, whereas standard potato starch ordinarily is washed free of protein, and control samples of such potato starch were analyzed to contain only about 0.18 to 0.20 percent protein. It is believed that the improved flavor of the products made with recovered potato starch results from the fact that such starch has not been thoroughly purified, and contains more protein than other potato non-starch solids.

Thus, the combination of this snack process with an existing potato processing line in which small, otherwise useless raw potatoes are cooked and added to the potato mash along with potato starch recovered from the cutting operations reduces the loss of valuable potato solids, reduces stream pollution, and adds to the flavor of the finished snack product.

I claim:

1. A method for making a potato based food snack product from a dough comprising the steps of mixing the dough and extruding a piece from the dough in preparation for frying the dough piece in hot cooking oil so that at the time the dough is immersed in the hot cooking oil it consists of a mixture of a. solids consisting essentially of cooked potato solids and ungelatinized starch, and
b. water,
c. in which the solids are more than 40 percent and up to about 50 percent by weight of the dough, and
d. in which the solids contain between about 30 to about 70 percent ungelatinized starch by weight, with the balance being cooked potato solids containing sufficient available free gelatinized starch to cause the dough piece to expand between 1.6 to 3.0 times when fried, cooking the dough piece in the hot cooking oil at a sufficiently high temperature and for a long enough period of time to cause the dough piece to expand to a thickness of between about 1.6 to about 3.0 times that of the original smallest dimension of the piece during extrusion to form a finished fried potato snack, and thereafter removing the fried potato snack from the oil.

2. The method according to claim 1 which includes extruding the dough, and immediately thereafter cutting the dough into pieces which fall directly into the cooking oil.

3. The method according to claim 1 wherein the ungelatinized starch is selected from the group consisting of raw potato starch and raw tapioca starch.

4. The method according to claim 1 including cooking the dough piece at a temperature between about 330° F to about 400° F.

5. The method according to claim 4 including frying the dough piece between about one minute and about two minutes.

6. The method according to claim 1 including extruding the dough through a die opening to form a tubular dough piece which is then fried.

7. A method for making a potato based food snack product from a dough comprising the steps of
mixing the dough and extruding a piece from the dough in preparation for frying the dough piece in hot cooking oil so that at the time the dough is immersed in the hot cooking oil it consists of a mixture of (a) solids consisting essentially of dehydrated cooked potato solids and ungelatinized starch, and (b) water, (c), in which the solids are more than 40 and up to about 50 percent by weight of the dough, and (d) in which the solids contain between about 30 to about 50 percent ungelatinized starch by weight, with the balance being cooked potato solids containing sufficient available free gelatinized starch to cause the dough piece to expand between 1.6 to 3.0 times when fried, cooking the dough piece in hot cooking oil at a sufficiently high temperature and for a long enough period of time to cause the dough piece to expand to a thickness of between about 1.6 and about 3.0 times that of the original smallest dimension of the piece during extrusion to form a finished fried potato snack, and thereafter removing the fried potato snack from the oil.

8. The method according to claim 7 wherein immediately after said extruding said piece is cut into pieces which fall directly into the cooking oil.

9. The method according to claim 7 wherein the ungelatinized starch is selected from the group consisting of raw potato starch and raw tapioca starch.

10. The method according to claim 7 including cooking the dough piece at a temperature between about 330° F to about 400° F.

11. The method according to claim 10 including frying the dough piece between about one minute and about two minutes.

12. The method according to claim 7 in which the fat content of the product after frying is between about 25 and about 35 percent by weight.

13. The method according to claim 7 wherein said extruding is through a die opening to form a tubular dough piece.

14. A method for making a potato based food snack product from a dough comprising the steps of
mixing the dough and extruding a piece from the dough through an extruder die opening in preparation for frying the dough piece, the mixing and extruding steps resulting in essentially no gelatinization of the ungelatinized starch in the dough, and the extruded dough being immediately thereafter cut into a dough piece and then immediately immersed in hot cooking oil so that at the time the dough is immersed in the cooking oil it consists of a mixture of (a) solids consisting essentially of ungelatinized starch and gelatinized starch solids provided by cooked potato solids; and (b) water; (c) in which the solids are more than 40 and up to about 50 percent by weight of the dough; and (d) in which the solids contain between about 30 to about 70 percent ungelatinized starch by weight, with the balance being said gelatinized starch solids containing sufficient available free gelatinized starch to cause the dough piece to expand between 1.6 to 3.0 times when fried;

cooking the dough piece in hot cooking oil at a sufficiently high temperature and for a long enough period of time to cause the dough piece to expand to a thickness of between about 1.6 and about 3.0 times that of the extruder die opening to form a finished fried snack product; and thereafter removing the fried potato snack from the oil.

15. The method according to claim 14 in which the ungelatinized starch is selected from the group consisting of potato starch and tapioca starch.

16. The method according to claim 14 in which the fat content of the finished product is between about 25 and about 35 percent by weight.

17. The method according to claim 14 wherein said extruding is through a die opening to form a tubular dough piece.

18. The method according to claim 14 wherein said extruding is through a die opening to form a tubular dough piece.

19. A method for making a potato based food snack product from a dough comprising the steps of
mixing the dough and roller-forming a piece from the dough in preparation for frying the dough piece in hot cooking oil so that at the time the roller-formed dough piece is immersed in the hot cooking oil it consists of a mixture of (a) solids consisting essentially of ungelatinized starch and gelatinized starch solids provided by cooked potato solids; and (b) water; (c) in which the solids are more than 40 and up to about 50 percent by weight of the dough; and (d) in which the solids contain between about 30 to about 70 percent ungelatinized starch by weight, with the balance being said gelatinized starch solids containing sufficient available free gelatinized starch to cause the dough piece to expand between 1.6 to 4.5 times when fried;

cooking the dough piece in cooking oil at a sufficiently high temperature and for a long enough period of time to cause the dough piece to expand to a thickness of between about 1.6 and about 4.5 times that of the original smallest dimension of the piece during the roller-forming step to form a finished fried potato snack; and thereafter removing the fried potato snack from the oil.

20. The method according to claim 19 in which the ungelatinized starch is selected from the group consisting of potato starch and tapioca starch.

* * * * *

UNITED STATES PATENT AND TRADEMARK OFFICE
CERTIFICATE OF CORRECTION

PATENT NO. : 3,997,684
DATED : December 14, 1976
INVENTOR(S) : MILES J. WILLARD

It is certified that error appears in the above-identified patent and that said Letters Patent are hereby corrected as shown below:

Col. 2, line 15, "the normally" should be -- the material is normally --.

Col. 4, line 14, "resmbles" should be -- resembles --.

Col. 10, line 65, "set by" should be -- set at --.

Col. 11, line 67, "fired should be -- fried --.

Col. 22, line 1, "masked" should be -- mashed --

Col. 25, line 32, "Example 23" should be -- Example 22 --.

Col. 28, line 52, "claim 14" should be -- claim 15 --.
(Claim 18)

Signed and Sealed this

Twenty-second Day of March 1977

[SEAL]

Attest:

RUTH C. MASON
Attesting Officer

C. MARSHALL DANN
Commissioner of Patents and Trademarks